Aug. 9, 1960

J. D. LANGDON 2,948,297

AUXILIARY NOZZLE

Filed Nov. 29, 1954

INVENTOR

*J. D. Langdon*

2,948,297
Patented Aug. 9, 1960

2,948,297

AUXILIARY NOZZLE

Jesse D. Langdon, Long Beach, Calif.
(1 John St., East Rockaway, N.Y.)

Filed Nov. 29, 1954, Ser. No. 471,607

2 Claims. (Cl. 137—525.1)

This application is a continuation in part of a series of copending applications and patents stemming from Pat. 2,270,737, Jan. 20, 1942, filed July 26, 1940, copending with continuing Pat. 2,382,427, Aug. 14, 1945, filed Sept. 9, 1941, continued by Pat. 2,328,382, Aug. 31, 1943, filed Oct. 8, 1941, copending with Pat. 2,371,449, Mar. 13, 1945, filed Dec. 12, 1942. Other applications copending with and continuing from 2,382,427 being 522,959 filed Feb. 18, 1944, now Patent No. 2,787,282, granted Apr. 2, 1957 and Ser. No. 560,841, filed Oct. 28, 1944, herewith copending, all disclosing a vented casing having a flexible member made of distortable material therein with a shouldered inlet end and an outlet end closed by a slit diaphragm and representing species of the invention commonly disclosing a tubular sleeve member closed by a transversely disposed diaphragm.

The present invention pertains to nozzles adapted to be attached to the outlet end of a fluid pressure supply source and including means for attaching the outlet or delivery end of the nozzle to a hose or pipe liable to be exposed to poisonous gases or submerged in contaminated liquid and with the following objects and purposes in view, aims to provide:

A hollow body forming a casing having an inlet and outlet, a second hollow body made of deformable material capable of resuming shape and having an outlet end closed by a slit diaphragm inserted into the inlet end of the first hollow body, the diaphragm facing the outlet end of said casing, the slit being normally closed, but permitting the flow of a velocity head of fluid from said inlet thru said second hollow body and said outlet, said inlet end of said casing provided with pressure sealing means including an expander extended into the hollow of the deformable body holding same juxtapositioned within said casing.

An inlet member adapted to connect with a supply source and pressure seal the inlet end of the first named hollow body forming the casing, said inlet member including a portion extended into and forming a spreader adapted to enter and urge the inlet end of the second named hollow body of deformable material radially outward, the spreader providing a relatively small inlet port and serving to: (a) Hold the deformable hollow body in operative position: (b) Support the slitted diaphragm against inversion thru the relatively small port: (c) Act as a guide for centralizing and aligning and assembling the deformable hollow body together with the first hollow body.

Vent means located between the inlet and outlet and communicating between the atmosphere and the hollow of a body forming a casing surrounding and supporting the sleeve of deformable material, the vent means formed by a groove recessed into the outer wall of said casing, air passage means being extended from the recess diagonally toward the inlet end of the hollow of said casing, said recess circumscribing the outer wall of said casing providing a skirt extended below the outmost end of said air passage means.

Means to simplify construction and reduce production cost by using a minimum of parts and material by providing construction features making it feasible to contain in a single piece of material, vents communicating between the hollow of the casing and a groove open to atmosphere recessed into the outer wall of the casing forming a skirt extended transversely of the outer end of said vents, the recess of the groove providing aligning and directional guide means for boring said vents.

Means to provide a flexible coupling for the inlet end capable of fitting a wide variety of fluid supply sizes by constructing same with an elongated wall area and providing means for the integration of said flexible coupling with an extension inside of the inlet end of a flexible sleeve forming coupling means and means to expand to retain a check valve in operative position within a hollow outer body.

Means of supporting the outer wall of a flexible sleeve-like coupling made of rubber-like material against undue expansion, by providing a ring of rigid material around said sleeve.

Other and further objects and purposes will appear during progress of the specification, as shown by the drawings, which illustrate two forms of reduction to practice, but do not limit the scope of the claims insofar as they coincide with the specification, as it is obvious the forms of reduction to practice may be changed accordingly.

Figure 1:
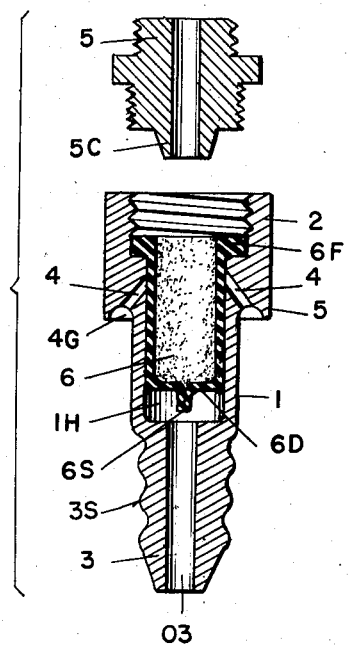
Fig. 1 is an exploded vertical median section of one form of the invention showing a hollow body and cap with a conical extension adapted to spread the flanged end 6F of a rubber-like sleeve 6.

The description of the drawings, specification and operation of the invention is generically as follows:

A nozzle 1 comprising a hollow body having a casing made of a single piece of material, an inlet end 2, adapted for pressure connection to a fluid pressure source and an outlet end 3, adapted for pressure connection to a delivery line, comprising a sleeve 6, of flexible distortable material inserted into the hollow 1H, and secured in position by flange means 6F concomitant with the inlet 2 and the proximate end of said sleeve 6; the opposite end of said sleeve extended toward outlet O3 and provided with a slit at 6S. The diaphragm 6D provides an imperforate portion secured in position bordering the slit 6S of said diaphragm 6D being extended transversely across at least a portion of the radius of the sleeve wall partially closing and obstructing pressure fluid flow thru the hollow of said sleeve 6 causing the sleeve to expand against the surrounding wall of the hollow body above said diaphragm 6D, to close air vents 4 extended diagonally toward inlet end 2 thru the wall of and communicating between hollow 1H and a groove 4G formed in the outer wall of said hollow body 1, said groove depth being directed inwardly of the outer wall and toward said inlet end beneath a skirt formed by a portion of the outer body wall, also forming the outer wall of said groove and concealing the outer ends of said air vents from lateral view, the groove 4G and the air passages 4 are contained in a single piece of material. The groove 4G forms a directional guide for boring the air passage means 4.

Figure 2:
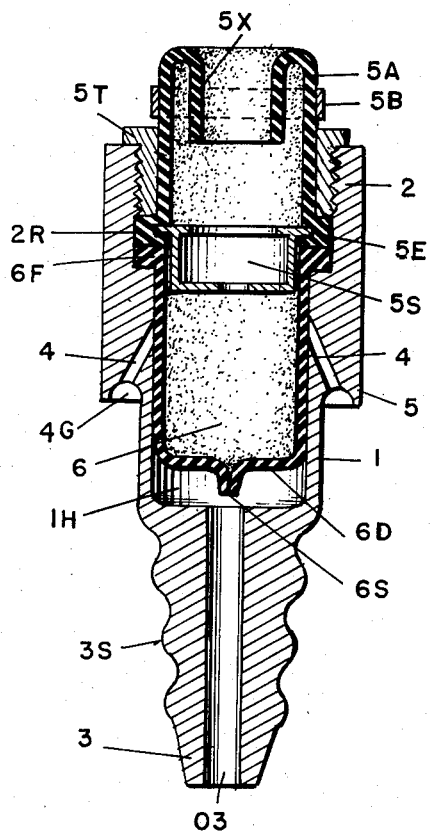
Fig. 2 is a vertical median sectional view showing an alternative form of the invention assembled with a cap in the form of a coupling member made of rubber-like material.

A device as illustrated in Fig. 2 combined with a flexible adapter coupling 5A for connecting between body 1 and a fluid pressure supply source, including matched assembly means formed by threads in this instance, for securing said adapter coupling 5A to said body 1, one end of the plug cap. Fig. 1 shows a conical spreader formed by an extension 5C, while Fig. 2 shows a plain flanged sleeve 5S forming a spreader secured integral with the inlet member 5A, extended into and supporting the inside of said sleeve, holding the same expanded and preventing said sleeve 6 from being pulled convergently inward at the flange 6F and out of position under effects of a pressure fluid velocity head passing thru said sleeve 6 from inlet 2 toward the outlet 3 of the hollow body 1 forming the nozzle, the velocity fluid head striking the imperforate portion of diaphragm 6D being impeded thereby, causing back pressure to elongate and expand said sleeve radially whereby a reverse flow from outlet 3 is prevented under conditions of sub-atmospheric pressure within the sleeve 6.

The species of the device shown by Fig. 2 illustrates an inlet member forming adapter cap 5A formed by a sleeve of rubber-like material extended outwardly from, and secured within the inlet end 2 by an outwardly extended annular flange 5E secured between the threaded collar 5T and the proximate face of flange 6F of the sleeve 6, concomitant at 2R within said inlet end 2 of said hollow body 1–1H, the upper end of said adapter 5A having a tubular portion turned inwardly and forming an elastic band 5X extended into and spaced away from the outer wall of said adapter 5A, for elastically surrounding and hugging the terminus of a fluid pressure supply source; the area of the inwardly turned end 5X of said adapter 5A being surrounded by an annular space, the area thereof being subject to the effects of internal fluid pressure to urge the inwardly extended portion 5X against the outer wall of the pressure fluid terminus.

Figure 3:
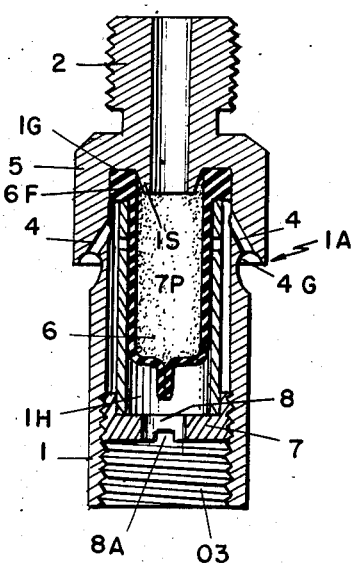
Fig. 3 is a vertical median section of another species of the invention showing a sleeve 7 having perforations 7P and supporting flange 6F of flexible member 6.

Fig. 3 shows another species of the device illustrated by Fig. 1 wherein the hollow body 1A—combines body 1 and cap 5 as at Fig. 1—to form a single unit made of one piece of material, the inlet end 2 of said hollow body provided with an annular groove 1G surrounding an annular extension 1S projecting into the inlet end of flexible sleeve 6 holding flange 6F of said flexible sleeve 6 in expanded position, a perforated tubular support 7 for member 6 secured to and extended from the inside of the outlet end O3 of hollow body 1A, the tubular support 7 being spaced away from the inner wall of body 1 over that area adjacent the inner end of vents 4, the tubular support 7 being perforated to communicate with the space formed between the support 7 and the wall of body 1 whereby atmosphere is permitted to enter between tubular support 7 and the wall of member 6 at such times as negative pressure exists therein collapsing flexible member 6 and closing same against any fluid ingress.

Note that the outlet end of tubular support 7 is provided with external threads—any other suitable matched type of supporting means can be provided. The outlet passage 8 of sleeve 7 shows a screw driver slot 8A, which may be used to insert the sleeve 7 into the internally threaded outlet O3, which is extended beyond the end of sleeve 7 to provide coupling means for a suitably threaded outlet expansion. A ring or band 5B of rigid material is provided surrounding the member 5A as protection against bursting under excessive pressure.

The extensions 5C of Fig. 1, 5S of Fig. 2 and 1S of Fig. 3 all show solid outer face presented toward the shouldered end of deformable member 6.

Like numerals are used to designate equivalent elements of construction thruout the drawings, modified by letters to form designating characters to differentiate between modifications of equivalent elements instantly used as illustrative of the several forms of reduction to practice disclosed by the drawing and described by the specification.

Having described the invention as illustrated by the drawings, the following claims are made:

1. A nozzle having a hollow body forming a casing made of a single piece of material comprising an inlet end adapted for pressure connection to a source of fluid supply and an outlet end adapted for connection to a delivery line, including a flanged sleeve made of distortable material inserted in the inlet end of said hollow body and secured in position by the sleeve flange concomitant said inlet end of said hollow body, the opposite end of said sleeve extended toward the outlet of said hollow body and provided with a slit diaphragm closing the distal end of the distortable sleeve and having an imperforate portion secured in position bordering the slitted portion of said diaphragm secured to and standing transversely across at least a portion of the outlet end of the sleeve partially closing and obstructing pressure fluid flow thru said sleeve, causing said sleeve to expand against the surrounding wall of the hollow body above said diaphragm; wherein the inlet end is provided with coupling means for a pressure fluid supply source, said coupling means being formed with an annular shoulder facing toward the flange of the distortable sleeve for pressure sealed connection between the shoulder and the flange surrounded by the inlet end of the hollow body, a tubular portion concomitant, secured to and extended from said coupling means beyond said shoulder and into said distortable sleeve securing and supporting the wall and flange of the sleeve in normal position within the inlet end of the hollow body, whereby said distortable sleeve is held in operative position against being displaced by the pressure fluid flow therethru.

2. A device of the character described comprising a hollow body having inlet and outlet ends with a flanged sleeve inserted in the inlet end and overlaying vent means communicating thru the wall of said hollow body, said flanged sleeve being made of distortable material with its flange resting on an annular shoulder provided within the inlet end of said hollow body; wherein said inlet end is provided with a flexible flanged coupling member adapted to slip over the terminus of a fluid pressure source, the coupling member made of distortable material and provided with a rigid flared extension forming an annular support for the flanged end of said coupling member, the flared extension concomitant and abutting the flanged end of the distortable sleeve within the inlet end of the hollow body, the rigid annular support protruding into the inlet end of the distortable sleeve member and holding both distortable members juxtapositioned within said inlet end of the hollow body concomitant the flanges of both members.

References Cited in the file of this patent

UNITED STATES PATENTS

| | | |
|---|---|---|
| 1,377,878 | French | May 10, 1921 |
| 1,515,998 | Clark | Nov. 18, 1924 |
| 2,051,211 | Hagopian | Aug. 18, 1936 |
| 2,092,757 | Groeniger | Sept. 14, 1937 |
| 2,145,541 | Forsberg | Jan. 31, 1939 |
| 2,159,692 | Fox | May 23, 1939 |
| 2,292,373 | Groeniger | Aug. 11, 1942 |
| 2,304,114 | Moore | Dec. 8, 1942 |
| 2,347,988 | Burke | May 2, 1944 |
| 2,373,555 | Folke | Apr. 10, 1945 |
| 2,382,427 | Langdon | Aug. 14, 1945 |
| 2,417,968 | Browne | Mar. 25, 1947 |
| 2,524,764 | Burke | Oct. 10, 1950 |
| 2,663,309 | Filliung | Dec. 22, 1953 |
| 2,670,757 | Delany | Mar. 2, 1954 |

FOREIGN PATENTS

| | | |
|---|---|---|
| 709,593 | Germany | Aug. 21, 1941 |